July 15, 1958 M. F. POLLARD 2,843,680

TELEPHONE RECEIVER ATTACHMENT

Filed June 26, 1956

Marvin F. Pollard
INVENTOR.

BY Clarence A. O'Brien
and Harvey B. Jacobson
Attorneys

Patented July 15, 1958

2,843,680

TELEPHONE RECEIVER ATTACHMENT

Marvin F. Pollard, Ludlow, Mo.

Application June 26, 1956, Serial No. 593,951

1 Claim. (Cl. 179—156)

This invention relates to attachment for telephones and particularly to an attachment which positions the hand set of the telephone conveniently for the use of a person who desires his hands free during telephone conversation.

An object of the present invention is to provide an attachment for a telephone hand set which automatically positions the speaker adjacent to and on the ear of the person and the microphone in proper disposition with respect to the person's mouth when the hand set and attachment are applied to the person's head.

A very important object of the invention is to provide a telephone hand set attachment which will function in the manner described and which requires absolutely no alteration, modification or change in the standard telephone instrument, all connection therewith being by a single friction clamp that fits snugly on the telephone hand set without penetrating or otherwise defacing the hand set which is ordinarily the property of the company furnishing telephone service rather than the user.

A further object of the invention is to provide an extremely simple attachment for a telephone requiring a minimum of bulk and weight so that it may be used comfortably and yet hold the telephone hand set securely in place.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
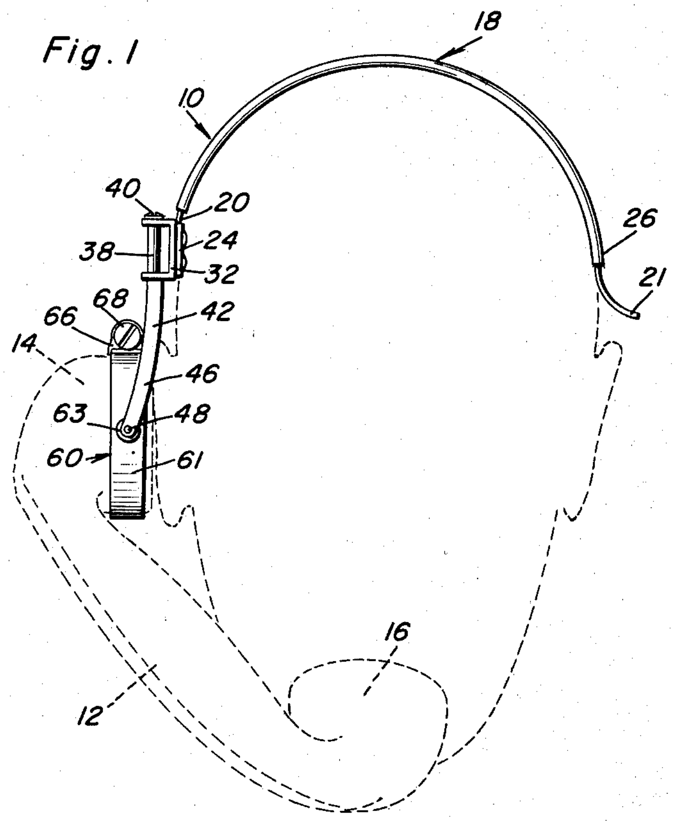
Figure 1 is a front elevational view of an attachment that has been constructed in accordance with the principles of the invention, the attachment being applied to a person's head and telephone hand set, the latter being schematically represented in dotted line.
Figure 4:
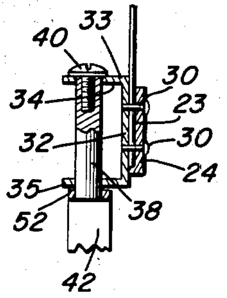
Figure 4 is a sectional view taken approximately on the line 4—4 of Figure 2, parts being shown in elevation.
Figure 2:
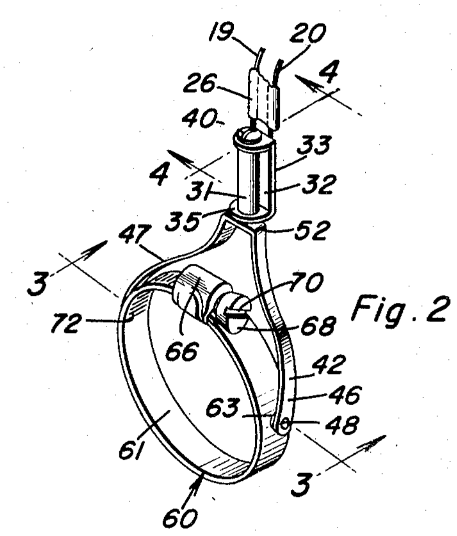
Figure 2 is a fragmentary perspective view of the attachment of Figure 1.

In the accompanying drawing there is an attachment 10 that is constructed in accordance with the principles of the invention. This attachment is used with a telephone hand set 12, the latter having a receiver part 14 at one end and a microphone part 16 at the opposite end in accordance with telephone constructions most generally used at the present time. Attachment 10 consists of a resilient strap 18 adapted to extend transversely across the top of a person's head and to be held by friction thereon. The resilient strap may be constructed in several ways, one being by having a pair of parallel resilient wires 19 and 20 formed with a loop 21 intermediate their ends at which they are joined, and having their extremities 23 fitted in a socket 24. A covering of friction enhancing material, for example synthetic or natural rubber or various plastics having a texture similar to rubber, is disposed on the wires 19 and 20. It may be applied by two rows of stitching or may be applied in other ways, as by cementing or otherwise adhering it.

Socket 24 is attached by small rivets 30 or otherwise connected to the cross member 32 of channel 33, this channel having sides 34 and 35 in which aligned apertures are formed.

Spindle 38 is mounted for rotation in the aligned apertures in sides 34 and 35 and is bored and tapped at its upper end to receive a screw 40 whose head overlies a part of the outer surface of side 34 preventing the spindle from being withdrawn from the small channel 33 in one direction. The spindle cannot be withdrawn from the small channel in the opposite direction due to the presence of fork 42. This fork has sides 46 and 47 whose outer ends are provided with trunnions 48 and 50 that are coaxially arranged. The opposite ends of the sides 46 and 47 are joined by transverse cross member 52 located parallel to the outer surface of side 35 of small channel 33. Accordingly the fork is capable of rotating about an axis through the longitudinal center of spindle 38.

Figure 3:
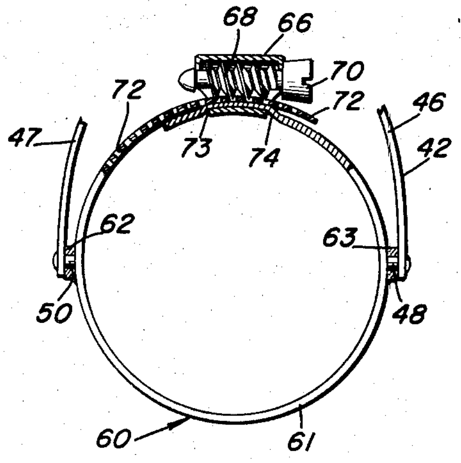
Figure 3 is a sectional view taken approximately on the line 3—3 of Figure 2, parts being shown in elevation.

Clamp 60 is mounted for pivotal movement about the common axis of trunnions 48 and 50 and is located between the sides 46 and 47 of fork 42. The clamp consists of a resilient band 61 that has apertured bosses 62 and 63 integrally formed therein or otherwise joined thereto, the ends of the band being overlapped (Figure 3). Gear case 66 has a lower slot in it through which the overlapped ends of the band pass. Worm gear 68 is held captive in the gear case 66 and has a screw driver kerf 70 at one end accessible from the exterior of the casing. A group of transverse slots 72 are formed in one end of the band 61, while the gear case is attached to the other band as at 73, by having a part of the case 66 nested in a depression 74 that is formed in the extremity of band 61. In order to actuate the clamp 60 the worm gear 68 is rotated in one direction or the other depending on whether it is desired to have the clamp tightened or loosened. Rotation of the worm gear causes the thread thereof to propel the end of the clamp band by progressively moving the slots 72 in one direction or the other depending on the direction of rotation that the worm gear is turned.

In use the clamp 60 is attached to the speaker of the hand set and the resilient strap is placed over the head of the user. Inasmuch as the hand set is capable of pivotal movement about two approximately intersecting axes, the most comfortable position of the telephone is automatically obtained. The speaker part of the hand set fits flush against the ear of the user helping to hold it in place on the person. Strap 18, therefore, partially supports the telephone hand set while additional support is obtained by having the speaker fit against the ear of the person who is using the attachment.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

For use on a telephone hand set, an attachment comprising a resilient strap having a covering thereon adapted to fit over the head of the user, a fork having a spindle attached thereto, means mounting said spindle for rotation about an axis coincident with the longitudinal axis of said spindle and on one end of said resilient strap, a pair of trunnions at the outer extremities of said fork establishing an axis of pivotal movement, a clamp carried by said trunnions, and adapted to frictionally engage the hand set of the telephone, said clamp comprising a band having overlapped ends, and means to draw said ends tightly to press the band onto the speaker of the hand set.

References Cited in the file of this patent

UNITED STATES PATENTS

| | | |
|---|---|---|
| 1,555,997 | Lidberg | Oct. 6, 1925 |
| 2,408,720 | Alger | Oct. 8, 1946 |
| 2,485,405 | Olney et al. | Oct. 18, 1949 |